(12) United States Patent
Arnott et al.

(10) Patent No.: US 9,632,769 B2
(45) Date of Patent: *Apr. 25, 2017

(54) SOFTWARE BUILD OPTIMIZATION

(75) Inventors: Andrew Layne Arnott, Kirkland, WA (US); Kieran Paul Mockford, Issaquah, WA (US); Dan James Moseley, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 107 days.

This patent is subject to a terminal disclaimer.

(21) Appl. No.: 13/083,186

(22) Filed: Apr. 8, 2011

(65) Prior Publication Data
US 2012/0260240 A1 Oct. 11, 2012

(51) Int. Cl.
*G06F 9/44* (2006.01)
(52) U.S. Cl.
CPC ...................................... *G06F 8/71* (2013.01)
(58) Field of Classification Search
None
See application file for complete search history.

(56) References Cited

U.S. PATENT DOCUMENTS

| | | | |
|---|---|---|---|
| 5,940,619 A | 8/1999 | Abadi et al. | |
| 5,960,196 A | 9/1999 | Carrier, III et al. | |
| 6,178,546 B1 | 1/2001 | McIntyre | |
| 6,263,358 B1 | 7/2001 | Lee et al. | |
| 6,266,805 B1 | 7/2001 | Nwana et al. | |
| 6,918,113 B2 | 7/2005 | Patel et al. | |
| 7,010,546 B1 | 3/2006 | Kolawa et al. | |
| 7,168,064 B2 | 1/2007 | Ousterhout et al. | |
| 7,197,417 B2 | 3/2007 | Pramanick et al. | |
| 7,209,851 B2 | 4/2007 | Singh et al. | |
| 7,266,181 B1 | 9/2007 | Zirngibl et al. | |
| 7,693,820 B2 * | 4/2010 | Larson et al. | 707/999.002 |
| 7,694,291 B2 | 4/2010 | Chen et al. | |
| 7,797,689 B2 * | 9/2010 | Mockford | 717/151 |
| 7,856,604 B2 * | 12/2010 | Hooper et al. | 715/841 |
| 8,225,302 B2 | 7/2012 | Waugh et al. | |

(Continued)

OTHER PUBLICATIONS

Elwasif, et al., "Bocca: A Development Environment for HPC Components", Retrieved at << http://www.mcs.anl.gov/uploads/cels/papers/P1430.pdf >>, Oct. 21-22, 2007, pp. 9.

(Continued)

*Primary Examiner* — Issac T Tecklu
(74) *Attorney, Agent, or Firm* — Dicke, Billig & Czaja, PLLC

(57) ABSTRACT

A method or software program that provides an analysis of a build, which can provide a developer with views of the build processes, is disclosed. Data is collected from the build. The collected data can include information regarding file access patterns from determining which files are accessed for read and which files are accessed for write by one or more software build tools and project interdependencies. The collected data can also include certain project properties, build configurations, intermediate directories such as logs, and other metadata of the build. The collected data is injected into a relational database that can be queried. The information developed in a database query can be applied to optimize the build.

20 Claims, 4 Drawing Sheets

(56) References Cited

U.S. PATENT DOCUMENTS

| | | | |
|---|---|---|---|
| 8,245,192 B1* | 8/2012 | Chen et al. | 717/122 |
| 8,365,138 B2 | 1/2013 | Iborra et al. | |
| 8,464,210 B1 | 6/2013 | Tarle et al. | |
| 8,776,014 B2 | 7/2014 | Arnott et al. | |
| 2002/0120921 A1 | 8/2002 | Coburn et al. | |
| 2002/0199170 A1 | 12/2002 | Jameson | |
| 2003/0145124 A1 | 7/2003 | Guyan et al. | |
| 2005/0038767 A1 | 2/2005 | Verschell et al. | |
| 2005/0183075 A1 | 8/2005 | Alexander et al. | |
| 2005/0188350 A1 | 8/2005 | Bent et al. | |
| 2005/0216555 A1 | 9/2005 | English et al. | |
| 2007/0050762 A1 | 3/2007 | Chen et al. | |
| 2007/0136718 A1* | 6/2007 | Mockford | 717/127 |
| 2007/0168974 A1* | 7/2007 | Mockford | 717/124 |
| 2007/0250473 A1* | 10/2007 | Larson et al. | 707/2 |
| 2008/0005729 A1 | 1/2008 | Harvey et al. | |
| 2008/0154840 A1 | 6/2008 | Rathi et al. | |
| 2008/0178298 A1 | 7/2008 | Arai et al. | |
| 2008/0201705 A1 | 8/2008 | Wookey | |
| 2008/0301639 A1* | 12/2008 | Bell et al. | 717/120 |
| 2008/0320151 A1 | 12/2008 | McCanne et al. | |
| 2009/0037365 A1* | 2/2009 | Sinclair et al. | 707/2 |
| 2009/0106730 A1 | 4/2009 | Mockford | |
| 2009/0138593 A1 | 5/2009 | Kalavade | |
| 2009/0164534 A1* | 6/2009 | Mercer | 707/205 |
| 2010/0042974 A1 | 2/2010 | Gutz et al. | |
| 2010/0050156 A1 | 2/2010 | Bonanno et al. | |
| 2010/0115001 A1* | 5/2010 | Soules et al. | 707/821 |
| 2010/0191690 A1 | 7/2010 | Bitonti et al. | |
| 2010/0192135 A1 | 7/2010 | Krishnaswamy et al. | |
| 2010/0262948 A1 | 10/2010 | Melski et al. | |
| 2010/0281461 A1 | 11/2010 | Tyler et al. | |
| 2012/0079447 A1* | 3/2012 | Arnott et al. | 717/101 |

OTHER PUBLICATIONS

Chelf, Ben, "Software Build Analysis", Retrieved at << http://www.coverity.com/library/pdf/Coverity-Software-Build-Analysis.pdf >>, Retrieved Date: Dec. 28, 2010, pp. 17.

Lungu, et al., "The Small Project Observatory: Visualizing Software Ecosystems", Retrieved at << http://www.inf.usi.ch/phd/lungu/research/publications/resources/lungu-est.pdf >>, Apr. 30, 2009, p. 1-23.

Tappolet, Jonas, "Semantics-aware Software Project Repositories", Retrieved at << http://people.csail.mit.edu/pcm/ESWC08PHD/tappolet.pdf >>, pp. 5, Publication Date Mar. 3, 2009.

The Final Office Action for U.S. Appl. No. 12/889,207 mailed Jul. 15, 2013 (12 pages).

The Office Action for U.S. Appl. No. 12/889,207 mailed Oct. 25, 2013 (12 pages).

The Office Action for U.S. Appl. No. 12/889,207 mailed Mar. 18, 2013 (15 pgs).

The Notice of Allowance for U.S. Appl. No. 12/889,207 mailed Feb. 26, 2014 (17 pages).

\* cited by examiner

SOFTWARE BUILD OPTIMIZATION

CROSS REFERENCE TO RELATED APPLICATION

This disclosure claims priority to U.S. patent application Ser. No. 12/889,207, filed on Sep. 23, 2010.

BACKGROUND

A software build is either the process of converting source code files into one or more software artifacts that can be run on a computing device or the result of doing so. For example, aspects of a software build include compiling source code files into executable code and linking objects together to perform an intended function. An incremental build is a software build where a sub-set of source code files are processed, such as source code files that have had changes made to them since the last build. An incremental build can increase the speed of the build process. A software build process can be slow, and typically just a few of the inputs are changed. Consequently, just a few of the outputs can be updated during an incremental build.

Software developers typically employ a build utility to perform a software build including an incremental software build. A build utility is a software development tool including a set of one or more build tools that can be used to perform a software build. A build tool can be used to manage a specific process of building a computer program and can at times coordinate and control other programs. The build utility manages the set of build tools to compile and link the various files in a particular order. As software projects evolve and grow their build system grows with it, often to proportions so large it becomes impractical for developers to keep track of how the build works, which causes maintenance issues, deployment problems, and slow builds. Build utilities use either a rough approximation to address these concerns, which at best provide incomplete solutions, or they are designed to address concerns of a specific software build and are not adaptable for general applicability.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

The present disclosure is directed to a method or software program that provides an analysis of a build, which can then be accessed by tools to optimize the build. In one example, the method provides both a comprehensive high-level view and a detailed low-level view of the build process including build interdependencies. Data collected from the build can include information regarding file access patterns from determining which files are accessed for read and which files are accessed for write by one or more software build tools and project interdependencies. The data collected can also include certain project properties, build configurations, intermediate directories, logs, and other metadata of the build. The collected data is injected into a database that can be queried, such an SQL database or other data store that can be queried.

Optimization tools use the data generated in the queries to optimize the build such as to correct flaws, enhance performance, or aid in future build projects, or some combination of these. For example, the tools can query the database to depict build projects and project interdependencies in reports; detect flaws in the build process and draw attention to these flaws in graphs or other visualizations; auto-correct some types of these flaws; or adjust the build for optimal scheduling or to skip parts of the build so that future builds complete more quickly. Also, a tool can act as a background service to detect changes in the file system relevant to the build. The tool can tag projects as out-of-date when direct or indirect inputs or direct outputs have been altered, and either begins a background build or allows a future user-initiated build to be completed with up-to-date checks already completed.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims. It is to be understood that features of the various embodiments described herein may be combined with each other, unless specifically noted otherwise.

Figure 1:
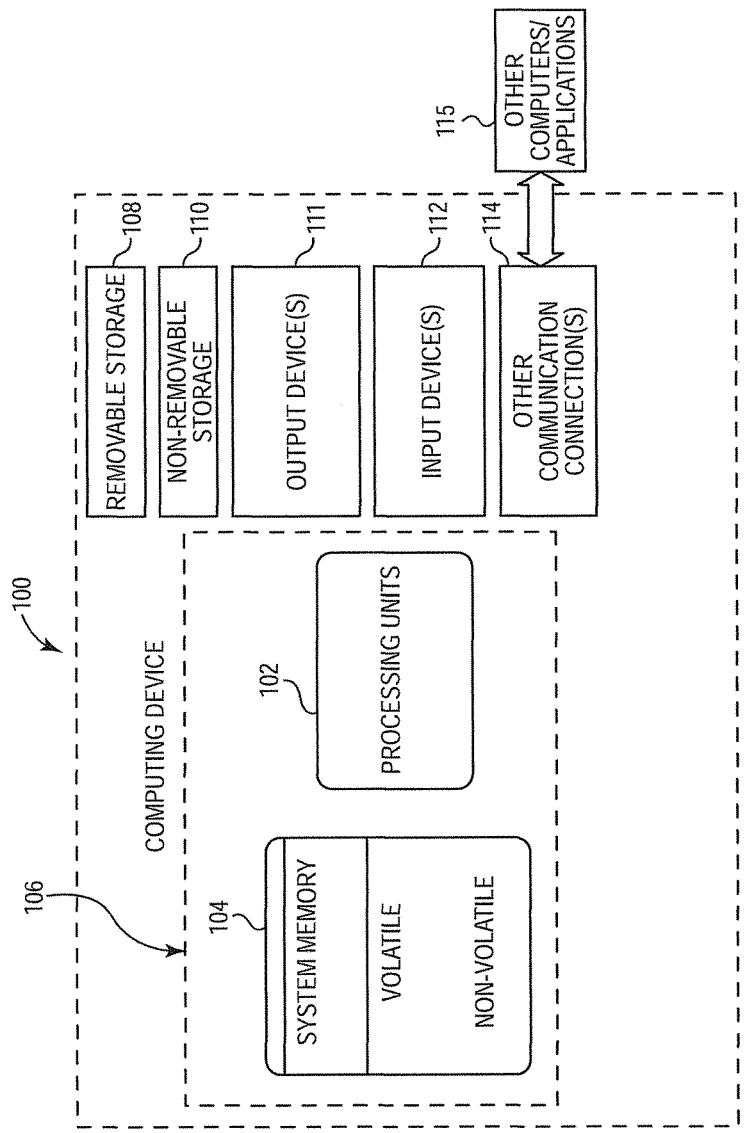
FIG. 1 is a block diagram illustrating an example computing device.

FIG. 1 illustrates an exemplary computer system. In one example, the computer system can perform a variety of processes and functions. For example, the computer system can be employed as an operating environment for a developer tool for performing a software build including a software build analysis of the present disclosure, and the computer system can be included as an example of a computing device for executing a software product resulting from the software build.

The exemplary computer system includes a computing device, such as computing device 100. In a basic configuration, computing device 100 typically includes a processor architecture having one or more processing units, i.e., processors 102, and memory 104. Depending on the exact configuration and type of computing device, memory 104 may be volatile (such as random access memory (RAM)), non-volatile (such as read only memory (ROM), flash memory, etc.), or some combination of the two. This basic configuration is illustrated in FIG. 1 by dashed line 106. The computing device can take one or more of several forms. Such forms include a person computer, a server, a handheld device, a consumer electronic device (such as a video game console), or other.

Computing device 100 can also have additional features or functionality. For example, computing device 100 may also include additional storage (removable and/or non-removable) including, but not limited to, magnetic or optical disks or solid state memory, or flash storage devices such as removable storage 108 and non-removable storage 110. Computer storage media includes volatile and nonvolatile, removable and non-removable media implemented in any suitable method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, universal serial bus (USB) flash drive, flash memory card, or other flash storage devices, or any other medium that can be used to store the desired information and that can be accessed by computing device 100. Any such computer storage media may be part of computing device 100.

Computing device 100 includes one or more communication connections 114 that allow computing device 100 to communicate with other computers/applications 115. An example communication connection can be an Ethernet interface. In some examples, the computing device can also have one or more additional processors or specialized processors (not shown) to perform processing functions offloaded from the processor 102. Computing device 100 may also include input device(s) 112, such as keyboard, pointing device (e.g., mouse), pen, voice input device, touch input device, etc. Computing device 100 may also include output device(s) 111, such as a display, speakers, printer, or the like.

The computing device 100 can be configured to run an operating system software program and one or more software applications, which make up a system platform. In one example, the computing device 100 includes a software component referred to as a managed, or runtime, environment. The managed environment can be included as part of the operating system or can be included later as a software download. The managed environment typically includes pre-coded solutions to common programming problems to aid software developers to create software programs, such as applications, to run in the managed environment.

A computer application configured to execute on the computing device 100 includes at least one process (or task), which is an executing program. Each process provides the resources to execute the program. One or more threads run in the context of the process. A thread is the basic unit to which an operating system allocates time in the processor 102. The thread is the entity within a process that can be scheduled for execution. Threads of a process can share its virtual address space and system resources. Each thread can include exception handlers, a scheduling priority, thread local storage, a unique thread identifier, and a thread context (or thread state) until the thread is scheduled. A thread context can include the thread's set of machine registers, the kernel stack, a thread environmental block, and a user stack in the in the address space of the process corresponding with the thread. In parallel applications, threads can be concurrently executed on the processor 102.

A build process can be partially divided into units that may be known as build projects or project files. Each build project indicates the input files and settings that will produce one or a relatively small number of intermediate or final output files. A build project may explicitly declare other projects it depends on, indicating that those other projects do work before the build project begins its own work.

As introduced above, software build systems evolve and grow with their corresponding software projects. Often, these build systems grow to proportions so large it becomes impractical for developers and existing build utilities to keep track of how the build works, causing maintenance issues, deployment problems and slow builds. For example, software builds can contain errors, such as timing errors, that are difficult to detect. Also, slow builds occur when unchanged files are built, which may be known as an "overbuild." Conversely, files might not be built when they depend, possibly indirectly, on a file that has changed because the build process was not aware of the dependency, which may be known as an "underbuild." Certain tools or systems, referred to here as build trackers or simply trackers, can collect raw data related to builds, but the data is vast and too often relates to issues that do not address a developer's particular concerns. Even if the data regarding the issue of interest can be isolated, it is often difficult to decipher. Furthermore, build trackers have difficulty detecting project-to-project relationships, particularly if dependent relationships are not expressed in the project file and could present a timing break if a scheduler cannot determine whether one project is to be built before another.

Figure 2:
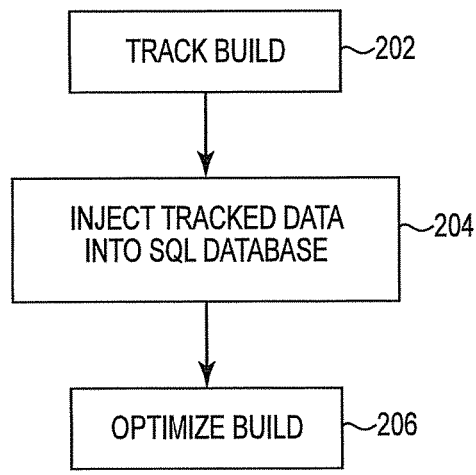
FIG. 2 is a block diagram illustrating an example method employed to analyze a build with the computing device of FIG. 1.

FIG. 2 illustrates a method 200 that provides an analysis of a build, which tools can use to optimize the build processes. In one example, the method 200 provides both a comprehensive high-level view and a detailed low-level view of the build process including build interdependencies. Method 200 collects data from the build at 202. For example, the method receives detailed information from actual builds of an entire tree of software products. The data collected includes information regarding file access patterns from determining which files are accessed for read and which files are accessed for write by one or more software build tools and projects. The data collected can also include certain project properties, build configurations, intermediate directories, logs, and other metadata of the build. The collected data is injected into a database that can be queried, such as a relational database, at 204, such as with a structured query language (SQL), or an SQL database. Optimization tools apply data developed in particular queries to optimize the build at 206. Optimizing the build includes correcting flaws, enhancing performance, or automatically aiding in future builds, or some combination of these.

Method 200 can be implemented as a single tool or a combination of tools to be run on the computing device 100, such as during the development of the application. In one example, the tool is a software program or part of a software package. The software program can be included in a computer readable storage medium storing computer executable instructions for controlling a computing device, such as computing device 100, to perform the method 200. In one example, the tool can be a part of an integrated development environment, or IDE. The IDE can include a code editor, a compiler, other build tools, a debugger and other tools for developing, testing, and/or addressing issues in an application. An example of an IDE is available under the trade designation "Visual Studio" from Microsoft, Inc. of Redmond, Wash. The software program can also be a separate product that can be used with one or more IDE packages or as a stand-alone product. In another example, the features of the method can be provided with two or more software tools as separate software programs, as add-on or plug-ins to a one or more IDE packages, or other products or combinations.

Figure 3:
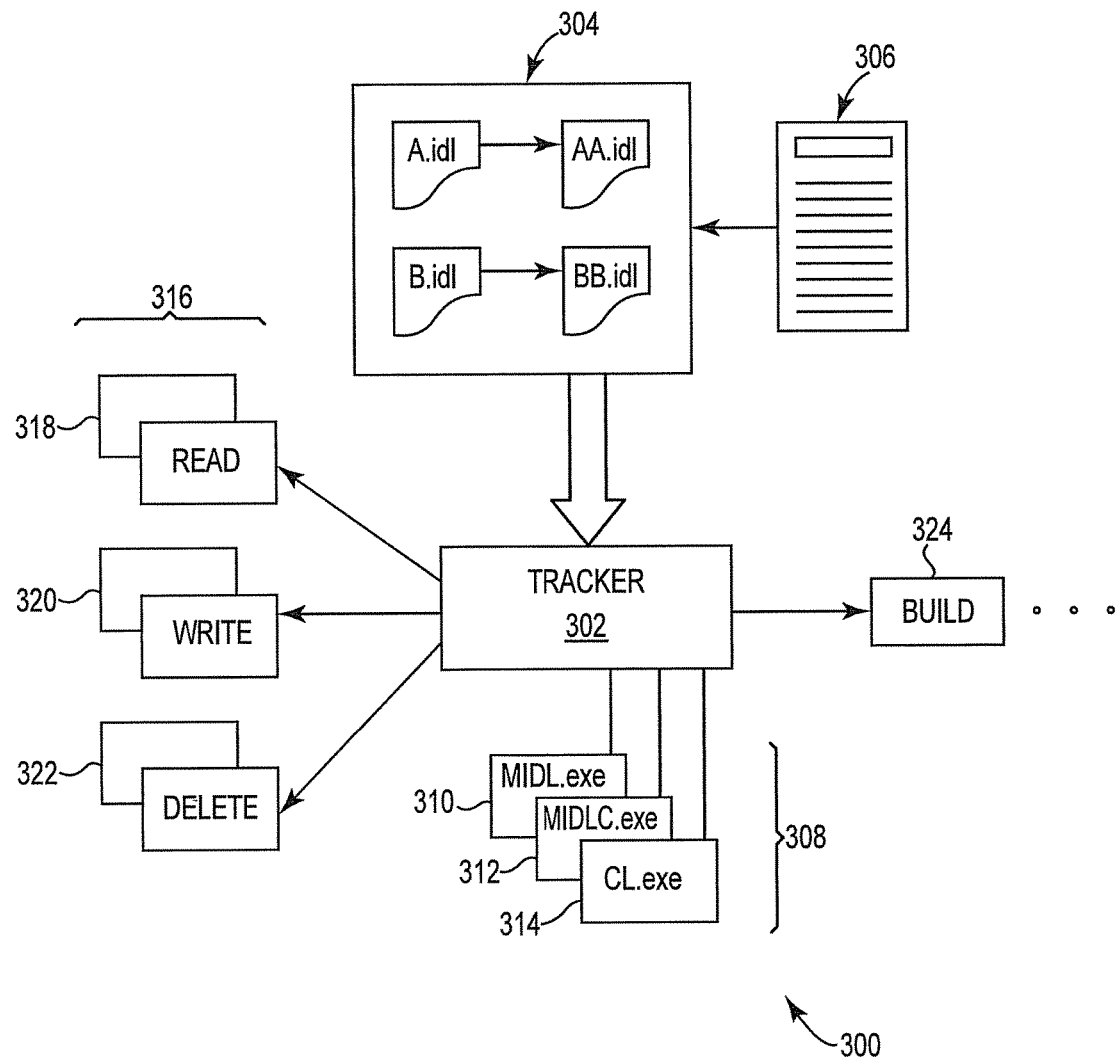
FIG. 3 is a schematic diagram illustrating an example tracking process employed in the method illustrated in FIG. 2.

FIG. 3 illustrates an example tracking and recording system 300 that can be employed in method 200 to collect data, such as at 202. The system 300 can be employed during an actual build and on an entire tree of software projects. The illustrated example includes one stage of the build, which can be repeated for additional stages. The system 300 includes a tracker 302 used to track files 304 and other information 306 accessed by one or more executable applications such as build tools 308 during a build. In one example, data collected can be used to drive an incremental build of the files to bring the build up to date. One of the build tools 308, such as tool 310 can invoke other build tools 312, 314, and every build tool 310, 312, and 314 is tracked with tracker 302. In one example, each thread in a multi-threaded tool is tracked separately, which can preserve a pattern of access that could otherwise be lost.

In one example, the tracker 302, rather than the build process itself, invokes the build tools 308. The command to start a tool, such as MIDL.exe in tool 310, which is normally given to an operating system, is redirected and given to tracker 302 instead. Similarly, whenever the build process requests to open the file 304, the request is handled by the tracker 302, which then redirects the request to the operating system. As such, one example of the tracker 302 collects data and can be employed to alter or augment the behavior of an operating system, of applications, or of other software components by intercepting function calls or messages or events passed between software components. The tracker 302 can employ a library for instrumenting functions. An example library can include a software product sold under the trade designation of Detours from Microsoft, which intercepts functions by rewriting target function images.

Data collected during tracking can be temporarily stored in memory 104 until it is injected into the database at 204. Information regarding the accessed files 304 collected with the tracker 302 can be stored in tracker logs 316, which are can be referred to as an arbitrary file extension such as ".tlog." In many cases, every file read is written to a read log 318 and every file write is written to a write log 320. Additional tracker logs 316, such as a delete log 322, are contemplated. In one example, logs 316, 318, and 320 can be included in a single log file, which can be structured to keep the data from each of the logs separate from the other data. In one example, information from each tool can be stored in a separate tracker log 316, and further subdivisions of tracker logs 316, such as by thread, are contemplated. In addition to tracker logs 316, a build log 324 can be attached during the build. A software build process may record all activities and state during the build in a log, possibly using a component or tool that may be known as a build log 324. The build log 324 includes information such as certain project properties, the build configuration, intermediate directories (which may include .tlog files), and other information.

In addition to information on the accessed files 304, the tracker 302 can be configured to capture other data that influences builds. Such other data can include captured inputs, environmental variables, operating system, installed patches, and the like. In one example, the tools 308 invoked during a build can be considered as dependencies, and information regarding the tools 308 and their invocation can be captured and stored. In addition, information regarding shared files defining common build process steps, and other such shared files. Still further, additional information can include intermediate files. Intermediate files are generated directly or indirectly from the source files, but are not themselves the useful product of the build. This additional information can be useful when querying the database.

Data from the tracker log 316 and build log 324 are injected into a database that can be queried, such as an SQL database at 204 or other data store that can be queried. In one example the database is targeted for embedded and small-scale applications, for instance a database sold under the trade designation of Windows SQL Server Express from Microsoft, Inc. In one example, the data is injected asynchronously with the build. In another example, the injections can be made after much of the work of the build is finished, such as before or after the build exits, so as not to interfere with the build.

Figure 4:
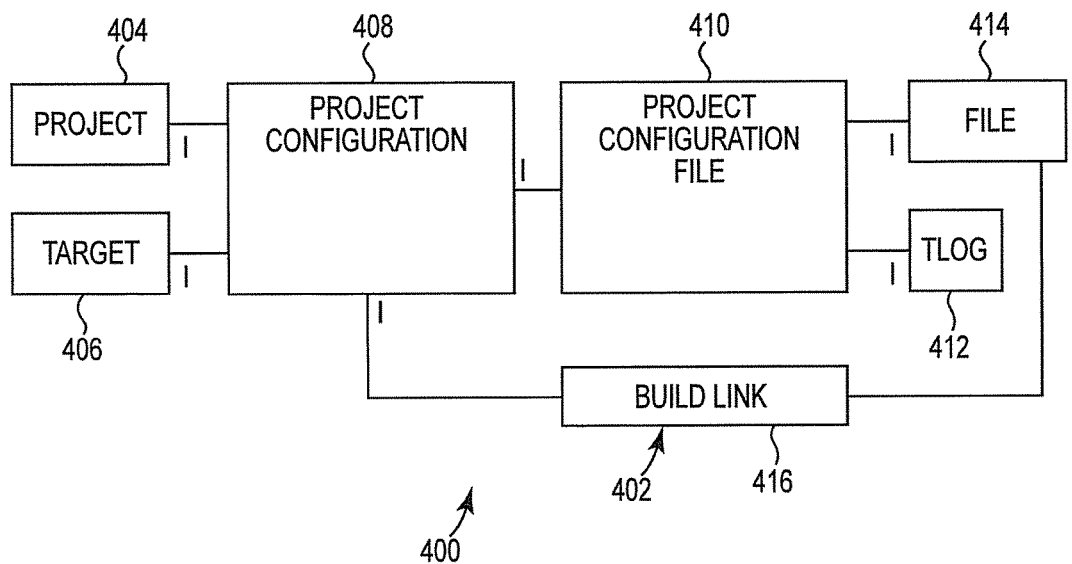
FIG. 4 is a schematic diagram illustrating an example database schema employed in the method illustrated in FIG. 2.

FIG. 4 illustrates a block diagram of a database schema 400 including several tables 402 that is an example for a relational database employed to receive the data from the tracker logs 316 and the build log 324. Project table 404 includes data regarding the features of the project files, such as file 304. A target table 406 includes data regarding any target that has been invoked from outside of the project. A build process can be composed of more than one named step, which may be known as a "target," and it can be invoked by name, or in an order otherwise inferred. Typically, a target produces specific output files given specific input files. If the input files and settings have not changed since the last translation, the target is considered to be "up to date," and its execution can be skipped. A project configuration table 408 includes data related to a specific configuration, such as Debug, of a specific project and is coupled to the project table 404 and the target table 406. The project configuration table 408 is coupled to a project configuration file table 410, which serves as a binding between a tracker log table 412 and a file table 414. The project configuration table 408 and the file table 414 are also coupled to a build link table 416, which includes data regarding a declared project reference between projects.

Examples of data in the project configuration table 408 can relate to build starts and stops, targets cleaned, up to date targets, dependencies, and dependents. In one example, a build of one configuration can be different than builds of another configuration. Also, configurations can be independently built and cleaned. Accordingly, separate configurations can each include a corresponding intermediate directory and a corresponding tracker log table 412, which can be the same, such as if isolation requirements of the information in the database are the same or similar.

The database schema 400 can also support incremental builds. For projects already including information in the database, the files in the tracker log 316 with an updated timestamp are read into the database, such as in the tracker log table 412. The content of these files replaces any existing content in the database associated with the corresponding files already in the tracker log table 412. External targets that are built can be added to the list of up-to-date targets for that project configuration. If an incremental build results in a tracker log files being deleted, the build can be considered as a "clean build." The targets can be cleared from a list of up-to-date targets in the project configuration table 408. For targets that are deleted, or cleaned, the corresponding files in the tracker log table 412 are included in the table 412 as the up-to-date target for that project configuration. A flag in the table 412 can be set to indicate the up-to-date-target is a cleaning target. A subsequent build of that project configuration results in that cleaning target as being removed from the up-to-date list and new targets will be included in the list.

The optimization tools use data generated in particular queries to optimize the build at 206. The data collected in the database as part of a build can be employed for a wide range of queries. The queries can be presented in a data cluster based on predefined and/or user-defined criteria to correspond with an optimization tool. The data cluster can be used to determine particular opportunities to optimize the build, which is then employed by tools to perform a particular optimizations or particular optimizations. In one example, tools can be employed to present flaws in the build process and correct these flaws.

Figure 5:
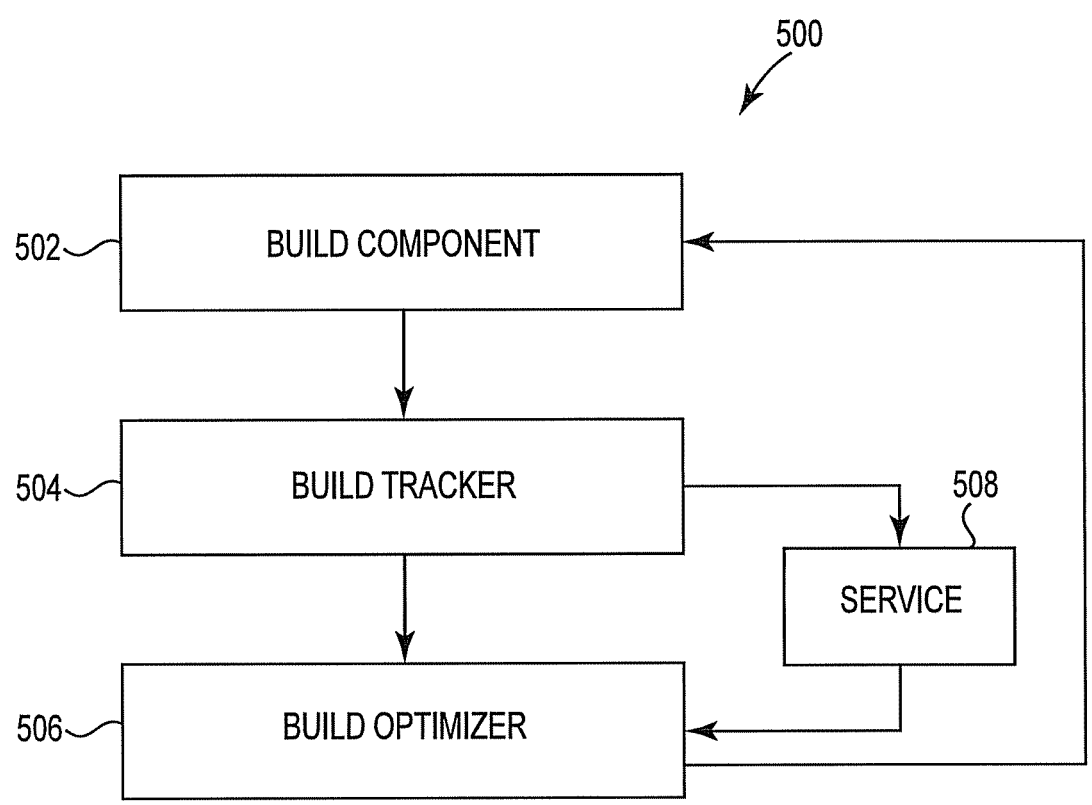
FIG. 5 is a block diagram illustrating an example computer program product to implement the method illustrated in FIG. 2.

FIG. 5 illustrates an example computer program product 500 or a system of computer program products, to implement the method 200 of FIG. 2. In one example, the computer program product 500 is a computer software product. The computer program product 500 includes components, that may be separate computer program products or two or more components can be coupled together in a computer program product. In the example shown, the computer program product includes a build component 502, which can be used to implement a build process on a target code. An example of a build component 502 includes a build platform sold under the trade designation of MSBuild available from Microsoft, Inc. The build component 502 interacts with a build tracker 504, such as the example tracking and recording system 300. The build tracker 504 interacts with a build optimizer 506 to provide the build optimizer with data queries. In one example, the build optimizer 506 queries the database in the recording system 300 for predefined criteria, and in another example, the recording system is programmed to generate a data cluster based on preset criteria and then provide the data cluster to the build optimizer. The build optimizer 506 can selectively interact with the build component 502 to optimize the build.

In one example, a query can determine build dependencies and interdependencies. Source trees often use "file references" where the path to the ".lib" is given instead of project references. The build ordering of such a source tree are either hard-coded into external build scripts or artificially forced within a build component 502 via phases/passes. In order to reduce the possibility of timing breaks, references are made to be project references when source code is present. If project references are used in a large source tree, however, building a leaf node often includes incrementally building other nodes, some of which may not have been changed.

An example build optimizer 506 can apply data developed regarding dependencies and interdependencies as a build accelerator tool. If the number of unchanged nodes is high, the build process will take significantly more time than if the build was able to focus on just changed nodes. The data collected during a prior build can provide the next build with information about which projects are to be built and which projects are not to be built. In particular, if a leaf node is about to be built and it depends on other projects, the build optimizer 506 can query the database to generate a list of dependencies for those projects and perform a timestamp check to determine which, if any, of those projects are to be built. In many cases, few or none of those projects will be built, and the leaf node can build as if no project references existed. The timestamp check can be used to determine the applicable information much more quickly than previously because the timestamp check does not open each project file.

In one example, a service 508 can be employed to follow the build tracker 504 and periodically update queries prior to the time the build optimizer 506 is called upon to interact with the build component 502. This can help reduce time that is otherwise used to perform an expensive data query at the time the build optimizer 506 is called. In the example above, the timestamp check can often involve hundreds of thousands of files. Rather than perform this check on-demand in a single query, service 508 creates a file system watcher to receive notifications whenever these files are changed and updates the database cache of these timestamps asynchronously. Then, the build optimizer 506 can calculate the repercussions of the file changes observed with the file system watcher, which can include cascading project up-to-date status changes. When a build is initiated, many if not all of the data required to make a fast decision about which projects to build is immediately available. The file system watcher is code editor agnostic, and the service 508 can function regardless of which editor is used.

In another example, the build optimizer 506 can include a continuous build service that observes file changes from the file system watcher, and then initiates a build of any projects that are now out of date. Any successful builds that result will be marked as up-to-date. In one example, logs from build failures are preserved and displayed to the developer with a visualization at the next time the developer attempts to build that project.

In another example, a build optimizer 506 can be used to automatically replace file references with project references. For example, a database query is be used to determine true project relationship, which enables file references to be replaced with project references. The query can be used to replace file references with project references with an update script that modifies the project files on disk, which could depend on the actual .targets files that are in use in that build component 502. Alternately, the build optimizer 506 can interact with the build component 502 to apply a database query of project dependencies to inject missing callbacks into a project instance before a project is built, which can result in a build of appropriate dependencies before the project build.

In other examples, the build optimizer 506 can be used to flag or correct conflicting build steps. Conflicting build steps can include steps that attempt to copy different files to the same memory location. The build optimizer can be configured to receive data queries that can diagnose data races or other unsynchronized copying to the same file location before or after they break a build. The build optimizer can then suggest corrections or even autocorrect problems to the flagged steps after they break the build or to prevent a break. In one example of this, the build optimizer 506 can be configured to use a data query to determine files that are written to by more than one project build. Files that are written to by more than one project build have the potential to cause timing breaks if the project builds are concurrent with each other. The build optimizer 506 can than configure the builds to write at separate times or to alternately order the build by writing a preprocessed header after it was read by another project.

Other examples of flagging and autocorrecting are contemplated. For example, flagging and/or autocorrecting can be based on queries used to discover missing project references or superfluous references. Build trees can be refactored with automatic project corrections including assisted code movement. Also, large projects or complicated projects can be separated into several smaller projects.

In another example, the build optimizer 506 can also be used to tune build performance. A query can be used to determine which build steps cause serialization. The build optimizer 506 can then hint to a scheduler which projects to build first. For example, the projects can be ordered so that the most expensive or most depended on projects are built ahead of other projects. The order can also be based on resource utilization such as whether the processors 102 are being utilized over input/outputs of the computing device 100. Still further, in cases where multiple nodes are used to perform the build, the build optimizer can be used to automatically distribute the process.

A data base query can also be used to determine a deep build analysis of individual enlistment. In addition to determining what triggered a build step and what compile error caused a cascade, queries can be used to determine what changesets touched a library, which can suggest retesting a set of changed files such as a shelveset. A binary search can determine what changeset introduced a failure, and this binary search can be included as part of the file system watcher of service 508. Individual enlistments can also be customized A query can determine a set of reverse dependencies or a partial enlistment source control checkout that can be used to determine directories and files to be built. In one example, the build optimizer 506 can skip projects or targets that depend on projects that have had build breaks to avoid cascading errors with causes that have been difficult to isolate.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method, comprising:
    collecting information regarding file access patterns of a plurality of build projects of a build process, the information being collected from determining which files are accessed for read and which files are accessed for write by one or more software build tools during a software build;
    injecting the collected information into a relational database;
    querying of the relational database;
    generating a list of interdependencies of build projects of the plurality of build projects in the build process from the querying of the relational database;
    perform a timestamp check to determine which of the build projects of the plurality of build projects in the build process are to be built; and
    optimizing, with a build optimizer, the software build by accelerating the software build, with a build accelerator tool in the build optimizer, based on the list of interdependencies of the build projects of the plurality of build projects in the build process and which of the build projects of the plurality of build projects in the build process are to be built.

2. The method of claim 1 wherein optimizing the build includes correcting flaws in the build, enhancing performance of the build, and automatically aiding future build projects.

3. The method of claim 1 wherein collecting information includes tracking files accessed by one or more executable applications during a build.

4. The method of claim 3 wherein tracking preserves a pattern of access.

5. The method of claim 1 wherein the collected information includes at least one of project properties, build configurations, intermediate directories, and metadata of the build.

6. The method of claim 5 wherein the collected information includes information regarding the build tools and invocation of the build tools.

7. The method of claim 1 wherein the collected information is injected asynchronously with the build.

8. The method of claim 1 wherein the relational database supports incremental builds.

9. The method of claim 8 wherein collected information injected into the relational database includes an updated timestamp.

10. The method of claim 1 wherein data developed in the query is presented to an optimization tool.

11. The method of claim 10 wherein the data developed in the query determines build dependencies and build interdependencies.

12. The method of claim 10 wherein the optimization tool performs the timestamp check.

13. The method of claim 10 wherein the optimization tool includes a continuous build service configured to observe file changes.

14. A computer readable storage medium storing computer executable instructions for controlling a computing device to perform a method comprising:
    collecting information regarding file accesses and patterns of a plurality of build projects of a build process, the information being collected from determining which files are accessed for read and which files are accessed for write by one or more software build tools during a software build;
    injecting the collected information into a relational database;
    querying of the relational database;
    generating a list of interdependencies of build projects of the plurality of build projects in the build process from the querying of the relational database;
    perform a timestamp check to determine which of the build projects of the plurality of build projects in the build process are to be built; and
    optimizing, with a build optimizer, the software build by accelerating the software build, with a build accelerator tool in the build optimizer, based on the list of interdependencies of the build projects of the plurality of build projects in the build process and which of the build projects of the plurality of build projects in the build process are to be built.

15. The computer readable storage medium of claim 14 and further comprising periodically updating queries prior to optimizing the build.

16. The computer readable storage medium of claim 14 wherein optimizing a build includes correcting conflicting build steps.

17. The computer readable storage medium of claim 14 wherein optimizing the build includes reordering projects.

18. The computer readable storage medium of claim 14 wherein information developed in the database query is used to determine serialization.

19. A computer readable storage medium storing a development tool including computer executable instructions for controlling a computing device, the development tool configured to perform a method comprising:

collecting information regarding file accesses and patterns of a plurality of build projects of a build process, the information being collected from determining which files are accessed for read and which files are accessed for write by one or more software build tools during a software build, wherein the collected information includes at least one of project properties, build configurations, intermediate directories, metadata of the build, and project-to-project relationships;

injecting the collected information into a relational database, wherein the relational database supports incremental builds;

querying of the relational database;

detecting interdependencies of build projects of the plurality of build projects in the build process from the querying of the relational database;

generating a data cluster based on the detected interdependencies of build projects of the plurality of build projects in the build process;

applying the data cluster to a build optimizer configured to selectively interact with build components to determine particular opportunities to optimize the software build based on the data cluster; and optimizing, with the build optimizer, the software build by applying, with a build accelerator tool in the build optimizer, the data cluster to perform a particular optimization based on the determined particular opportunities.

20. The computer readable storage medium of claim 19 and further comprising periodically updating queries prior to applying the data cluster to the build optimizer.

\* \* \* \* \*